(12) United States Patent
Gamer et al.

(10) Patent No.: US 11,794,533 B2
(45) Date of Patent: Oct. 24, 2023

(54) FASTENING DEVICE FOR A TIRE PRESSURE MONITORING SYSTEM

(71) Applicant: Huf Baolong Electronics Bretten GmbH, Bretten (DE)

(72) Inventors: Benedikt Gamer, Walzbachtal (DE); Sven Arnoldo, Malsch (DE); Andre Seifert, Pforzheim (DE); Alexander Treit, Aglasterhausen (DE)

(73) Assignee: Huf Baolong Electronics Bretten GmbH, Bretten (DE)

( * ) Notice: Subject to any disclaimer, the term of this patent is extended or adjusted under 35 U.S.C. 154(b) by 240 days.

(21) Appl. No.: 17/302,431

(22) Filed: May 3, 2021

(65) Prior Publication Data

US 2021/0252923 A1 Aug. 19, 2021

Related U.S. Application Data

(63) Continuation of application No. PCT/EP2020/050308, filed on Jan. 8, 2020.

(30) Foreign Application Priority Data

Jan. 14, 2019 (DE) ...................... 10 2019 100 825.5
Mar. 5, 2019 (DE) ...................... 10 2019 105 512.1

(51) Int. Cl.
*B60C 23/04* (2006.01)
(52) U.S. Cl.
CPC .............................. *B60C 23/0494* (2013.01)
(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0462; B60C 23/0411; B60C 23/20;
(Continued)

(56) References Cited

U.S. PATENT DOCUMENTS 6,557,406 B2   5/2003   Gabelmann
7,040,155 B1 * 5/2006   Lundell ............... B60C 23/0494
                                                  73/146.8

(Continued)

FOREIGN PATENT DOCUMENTS

CN      2837123 Y      11/2006
CN    108778783 A      11/2018
(Continued)

*Primary Examiner* — Andre J Allen
(74) *Attorney, Agent, or Firm* — Orbit IP

(57) ABSTRACT

A system for tire pressure monitoring has a tire valve for disposition on a rim of a vehicle and includes a tire valve stem and a tire valve base, a holding means being disposed on the tire valve base and a tire pressure monitoring unit having a housing in which a pressure sensor for measuring the tire pressure and a transmitter for wireless transmission of tire pressure data are disposed. The tire valve and the housing of the tire pressure monitoring unit can be fastened by means of a fastening element which is implemented in one piece or of the same material with the housing and which interacts with the holding means. The holding means and the fastening element are implemented such that a movement of the tire pressure monitoring unit on the tire valve base is only possible in the direction of a rim well.

12 Claims, 2 Drawing Sheets

(58) Field of Classification Search
CPC . B60C 23/0444; B60C 23/0479; B60C 11/24; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0477; B60C 23/0405; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 23/0484; B60C 13/00; B60C 19/003; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22
USPC .................................................. 73/146–146.8
See application file for complete search history.

(56) References Cited

U.S. PATENT DOCUMENTS

| | | | |
|---|---|---|---|
| 7,093,632 B1* | 8/2006 | Falkenborg | B60C 29/06 152/DIG. 13 |
| 7,395,702 B2 | 7/2008 | Qiu et al. | |
| 10,814,682 B2 | 10/2020 | Seifert | |
| 2005/0087006 A1* | 4/2005 | Uleski | B60C 23/0408 73/146 |
| 2008/0127724 A1* | 6/2008 | Qiu | B60C 23/0494 73/146.8 |
| 2018/0186201 A1* | 7/2018 | Hsu | B60C 25/18 |
| 2018/0186202 A1* | 7/2018 | Hsu | B60C 23/0494 |
| 2019/0030966 A1 | 1/2019 | Dementyev et al. | |
| 2019/0047337 A1* | 2/2019 | Seifert | B60C 29/02 |
| 2019/0217672 A1* | 7/2019 | Li | B60C 23/0494 |

FOREIGN PATENT DOCUMENTS

| | | |
|---|---|---|
| DE | 20 2007 009443 U1 | 9/2007 |
| EP | 1277601 A2 | 1/2003 |
| JP | 2014 113 854 A | 6/2014 |
| WO | 2017-216008 A1 | 12/2017 |

* cited by examiner

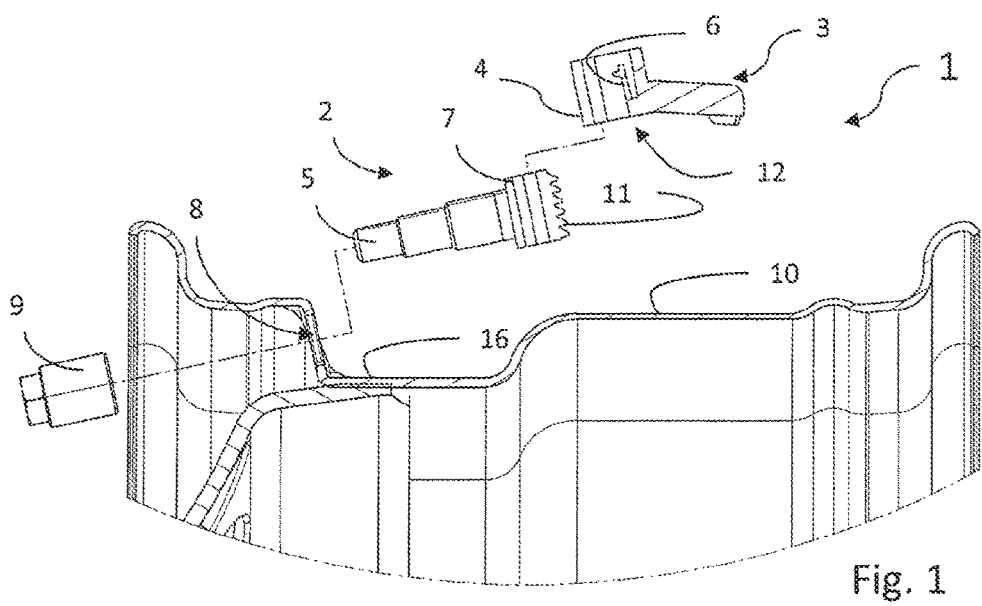
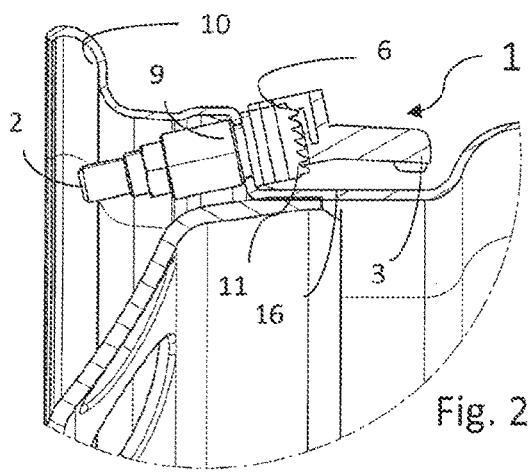
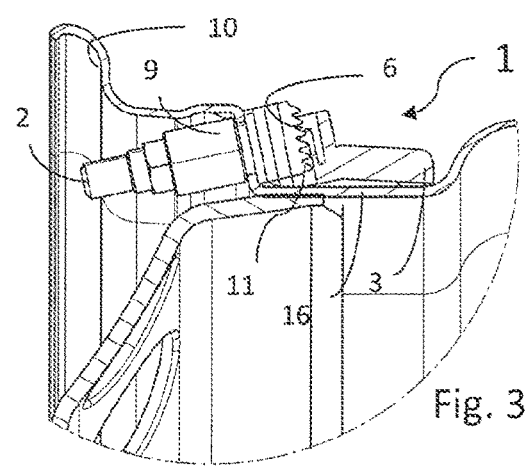
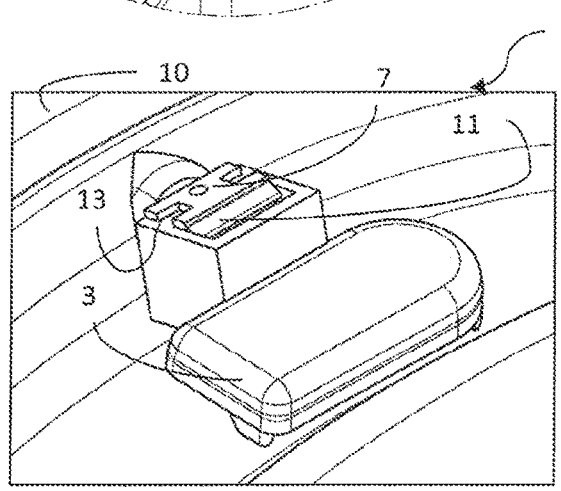
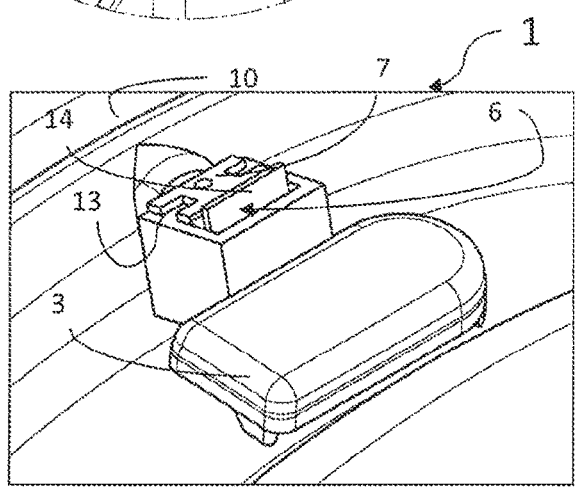
Fig. 1
Fig. 2
Fig. 3
Fig. 4
Fig. 5

FASTENING DEVICE FOR A TIRE PRESSURE MONITORING SYSTEM

CROSS-REFERENCE TO RELATED APPLICATIONS

This continuation application claims priority to PCT/EP2020/050308 filed on Jan. 8, 2020 which has published as WO 2020/148126 A1 and also the German application numbers 10 2019 100 825.5 filed on Jan. 14, 2019 and 10 2019 105 512.1 filed on Mar. 5, 2019, the entire contents of which are fully incorporated herein with these references.

DESCRIPTION

Field of the Invention

The invention relates to a system for tire pressure monitoring having a tire valve for disposition on a rim of a vehicle according to the features of the preamble of claim 1.

Such a tire pressure control system includes a tire pressure monitoring unit containing a pressure sensor and a transmitting device in a housing. The housing of the tire pressure monitoring unit is fastened to a tire valve of a pneumatic-tired wheel, so that the housing, in particular two base elements disposed on the underside of the housing, rests on the rim well or the tire pressure monitoring unit can be moved as far as possible on the rim well.

Background of the Invention

In known tire pressure control systems, as described, for example, in EP1277601A2, when fastening to the wheel rim thereof, the angle between the housing of the tire pressure monitoring unit and the valve is first determined and then the housing-valve unit is assembled on the wheel rim. A union nut having an integrated ring that breaks only after a certain force is reached is used. It is possible for the angle between the housing and the valve to be set incorrectly by the fitter. The possible consequences are, on the one hand, tensions in the housing, which arise due to the acting mechanical loads from tilting of the components when tightening the union nut and which can lead to the housing breaking. On the other hand, it is possible for a sealing ring to not lie completely on the inside of the wheel rim because the axes of the valve hole and valve do not run coaxially. As a result, optimal compression of the sealing ring cannot be guaranteed, which can lead to so-called leakage. Up to now, work instructions for fitters have been prepared to prevent the tipping effect during assembly. It is also important for the wheel electronics having the associated tire valve of the tire pressure control system to be used as universally as possible. During assembly, the tire pressure monitoring unit can be pivoted on the valve base in the direction of the rim well, so that the tire pressure monitoring unit can always sit with its base elements on the rim well in the assembled state, regardless of the level of the rim well, that is, the position of the valve bore relative to the rim well. The known tire pressure control system enables an adaptation to the geometric relationships of a given rim in this way.

SUMMARY OF THE INVENTION

The object of the invention is therefore to show a way in which a tire pressure control system, that can be used for different rim geometries, can be created with less effort and expense, avoiding tilting of the components when fastening the union nut and making possible stable support of the tire pressure monitoring unit on the rim well.

The object according to the invention is achieved by all the features and details of independent system claim 1 and a method having the features of claim 12. Advantageous and particularly expedient embodiments of the invention are specified in the dependent claims.

The terms "pre-assembly position" and "final assembly position" are defined below. In a pre-assembly position, the tire valve is already fastened to a rim with a pre-assembled tire pressure monitoring unit, wherein the tire pressure monitoring unit has already been pushed onto the tire valve base and the fastening element has passed at least one latching recess of the holding means.

In a final assembly position, the tire valve is already assembled on a rim, wherein the tire pressure monitoring unit has been moved in the direction of the rim well so that the housing of the tire pressure monitoring unit already touches the rim well or is disposed as close as possible to the rim well.

In a system according to the invention for tire pressure monitoring, the holding means and the fastening element are implemented such that the tire pressure monitoring unit on the tire valve base can only move in one direction, in particular in the direction of a rim well.

The essential advantage of this system according to the invention is that it can be adapted to a given rim geometry during assembly by moving the tire pressure monitoring unit on the valve base. Regardless of a rim well level of a given rim, the housing of the tire pressure monitoring unit thus rests on the rim well. Furthermore, the fastening of the tire valve on the rim and the fastening of the tire pressure monitoring unit on the tire valve are decoupled from one another or the tire valve is fastened before the tire pressure monitoring unit on the valve base is moved in the direction of the rim well, which causes the components to tilt when the tire valve is fastened to the rim using the union nut. A one-piece or materially uniform design of the fastening element with the housing and the provision of a holding means on the tire valve base, which only allows movement in one direction, namely in the direction of the rim well, creates a tool-free positioning of the tire pressure monitoring unit on the valve base at low cost and with increased comfort for a user.

A movement from the rim well in the opposite direction can advantageously be blocked by the fastening element. In this way, a particularly secure fixing of the tire pressure monitoring unit on the valve base can be realized when the tire pressure monitoring unit rests on the rim well.

Furthermore, it can be provided according to the invention that the fastening element is implemented as an elastic lever arm. One end of the lever arm is fastened to the housing of the tire pressure monitoring unit, while another end is free, wherein a snap nose is provided at the free end, the snap nose having a run-up bevel. The run-up bevel ensures that the lever arm can be deflected from the holding means when the housing is moved in the direction of the rim well. Furthermore, the snap nose is implemented such that a movement in the direction opposite to that of the rim well can be blocked by the holding means.

Furthermore, the lever arm can extend essentially orthogonally to the central axis of the tire valve. This enables the tire pressure monitoring unit to move in the direction of the rim well.

The construction is very inexpensive and simple when the lever arm is implemented as a metal insert. The metal insert can be fastened in the housing in a materially bonded manner, in particular by a plastic over-molding process. A non-positive or positive connection of the metal insert in the housing is also conceivable.

A measure improving the invention provides that the tire valve base has an essentially cuboid shape with an end face and side faces, wherein the guide is implemented on at least one vertical side face. Furthermore, it can be provided according to the invention for the tire valve base to comprise a guide, in particular in the form of a groove or a guide rib. The tire valve base is intended to be inserted into a complementary receptacle of the tire pressure monitoring unit. This has the advantage of the tire pressure monitoring unit thus being received on the tire valve in a manner secure against rotation. Furthermore, the guide blocks movement of the tire pressure monitoring unit in the axial direction of a central axis of the tire valve, so that movement can only take place in the direction of the rim well.

Furthermore, it can be provided according to the invention for the holding means to be implemented on the end face. The holding means ensures that movement of the tire pressure monitoring unit from the rim well in the opposite direction is blocked.

The holding means can advantageously be implemented in the form of at least two latching recesses disposed in a row. The latching recesses can thereby extend horizontally on the end face. This has the advantage of being able to set a plurality of positions of the tire pressure monitoring unit on the tire valve as a function of the rim level.

The construction is very inexpensive and simple when the housing is made from a thermoplastic, in particular from a polybutylene terephthalate reinforced with at least 25 percent glass fibers.

A measure improving the invention provides for the lever arm of the fastening element to protrude from the housing so that a release tab is formed. As a result, the dismantling of the tire pressure monitoring unit is made considerably easier and the comfort for a user is increased, since dismantling can take place without additional tools.

A subject of the present invention is also a method for assembling a system for tire monitoring on a rim having the following steps:
 a) introducing a tire valve having a pre-assembled tire pressure monitoring unit into a rim hole,
 b) fastening the tire valve to the rim by means of a union nut,
 c) inserting the tire pressure monitoring unit into a receiving space such that a pre-assembly position is assumed,
 d) transferring the tire pressure monitoring unit from a pre-assembly position to a final assembly position by a user through an actuation on the housing of the tire pressure monitoring unit, the tire pressure monitoring unit on the tire valve moving from the pre-assembly position into the final assembly position translationally and/or rotationally.

The guide is implemented as a vertical and straight guide rib or as a vertical and straight guide groove with the translational movement of the tire pressure monitoring unit on the tire valve. The end face of the tire valve base thus has a straight surface, which means that the tire valve can be manufactured inexpensively. The guide is implemented as an arcuate guide rib or as an arcuate guide groove with the rotational movement of the tire pressure monitoring unit on the tire valve. In this way, a distance or angle between the rim well and the tire pressure monitoring unit can be increased, which reduces tilting of the tire pressure monitoring unit on the rim when the tire valve is fastened.

BRIEF DESCRIPTION OF THE DRAWINGS

Further measures and advantages and technical features of the invention emerge from the claims, the following description and the drawings. Different features can be advantageous on their own and in any combination without departing from the scope of the invention. Further details, features and advantages of the subject matter of the invention emerge from the following description in connection with the drawing, in which exemplary preferred embodiments of the invention are shown. The drawing shows:

FIG. 1 an exploded illustration of a system for tire pressure monitoring according to a first embodiment, FIG. 2 a side illustration of the system for tire pressure monitoring in a pre-assembly position according to the first embodiment, FIG. 3 a side illustration of the system for tire pressure monitoring in a final assembly position according to the first embodiment, FIG. 4 a perspective illustration of the system for tire pressure monitoring according to the first embodiment, FIG. 5 a perspective illustration of the system for tire pressure monitoring with a release tab according to the first embodiment, FIG. 6 an exploded illustration of a system for tire pressure monitoring according to a second embodiment, FIG. 7 a side illustration of the system for tire pressure monitoring in a pre-assembly position according to the second embodiment, FIG. 8 a side illustration of the system for tire pressure monitoring in a final assembly position according to the second embodiment, FIG. 9 a perspective illustration of the system for tire pressure monitoring according to the second embodiment.

DETAILED DESCRIPTION OF THE PREFERRED EMBODIMENTS

Figure 6:
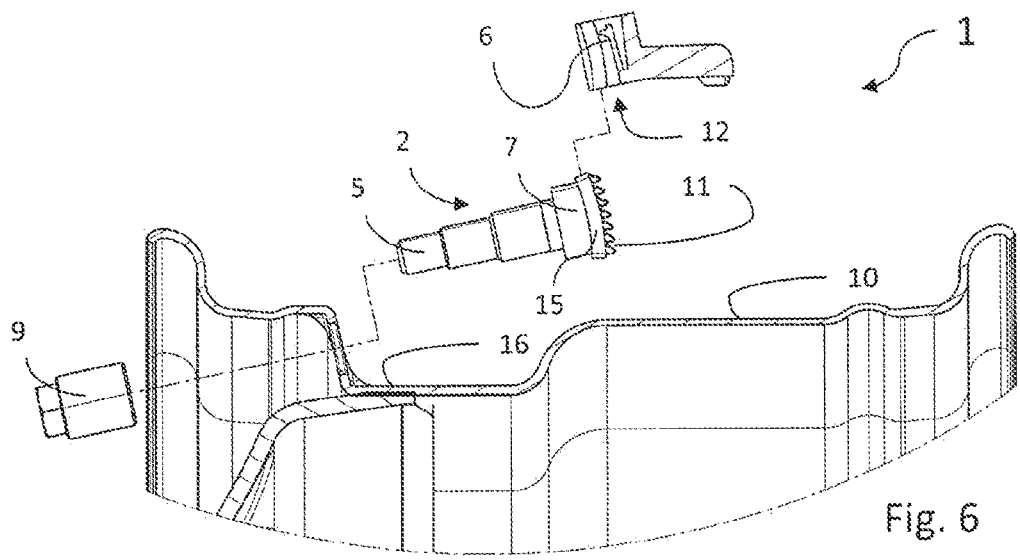

In the following figures, the same reference numerals are used for the same technical features of different embodiments.

FIG. 1 an exploded illustration of a system for tire pressure monitoring 1 according to a first embodiment. The system for tire pressure monitoring 1 can be assembled on a rim hole 8 of a rim 10. The system for tire pressure monitoring 1 comprises a tire valve 2 and a tire pressure monitoring unit 3, which is provided for disposition on the tire valve 2, and a union nut 9 for fastening the tire valve to the rim 10. The tire pressure monitoring unit 3 comprises a housing 4 made of plastic, which can be made of a thermoplastic, in particular a polybutylene terephthalate reinforced with at least 25 percent glass fibers, in which a pressure sensor (not shown) and a transmitting device are disposed. Measured pressure values transmitted by the tire pressure monitoring unit 3 can be received and evaluated using a suitable receiving device, so that a pressure drop can be signaled to the driver of a vehicle. The housing 4 is implemented with a receiving space 12 for the tire valve 2, wherein a fastening element 6 formed in one piece with the housing 4 and/or of the same material is provided within the receiving space 12. The fastening element 6 is implemented as an elastic lever arm. The lever arm thereby extends essentially orthogonally to the central axis of the tire valve. A snap nose is provided at the outer end of the lever arm, wherein the snap nose is implemented with a run-up bevel. Furthermore, the lever arm can be implemented as a metal insert. The metal insert can be fastened in the housing 4 in a materially bonded manner, in particular by a plastic over-molding process. A non-positive or positive connection of the metal insert in the housing 4 is also conceivable. The tire valve 2 is implemented having a tire valve base 7 and a tire valve stem 5 made of metal, wherein at least one holding means 11 is provided on the tire valve base 7 to interact with the fastening element 6 and the tire valve stem 5 with a thread for the union nut 9 for fastening the tire valve 2 to the rim 10. Furthermore, the tire valve base 5 can essentially have a cuboid shape with an end face and side faces, wherein a guide 13 is implemented on at least one side face, as shown in FIG. 4. The guide 13 is thereby provided in the form of a guide groove or guide rib 15. A complementary guide groove or guide rib 15 can be disposed in the housing 4. The holding means 11 can be disposed on the end face. The holding means 11 comprises at least two latching recesses disposed in a row, which extend essentially horizontally on the end face.

FIG. 2 shows a side illustration of the system for tire pressure monitoring 1 in a pre-assembly position according to the first embodiment, and FIG. 3 shows a side view of the system for tire pressure monitoring in a final assembly position according to the first embodiment.

The tire pressure monitoring unit 3 has a pre-assembly position and a final assembly position, wherein the tire pressure monitoring unit 3 can be transferred from the pre-assembly position into the final assembly position by a user through an actuation on the housing 4 of the tire pressure monitoring unit 3. The tire pressure monitoring unit 3 can thereby be moved translationally from the pre-assembly position into the final assembly position on the tire valve 2. In the embodiment shown, the fastening element 6 allows movement of the tire pressure monitoring unit 3 on the tire valve base 7 only in the direction of a rim well 16 due to the run-up bevel of the snap nose and the elasticity of the lever arm. The fastening element 6 thereby slides one after the other into the latching recesses of the holding means 11 when the housing 4 of the tire pressure monitoring unit 3 is actuated by an external force. A movement in the opposite direction from the rim well 16, the housing 4 is blocked by the fastening element 6. Furthermore, the fastening of the tire valve 2 on the rim 10 and the fastening of the tire pressure monitoring unit 3 on the tire valve 2 are decoupled from one another. To align the tire valve 2 on the rim 10, an anti-rotation protection (not shown) can be provided, for example, in the form of at least one spanner flat on the tire valve 2, which interacts with at least one complementary surface of the rim 10.

In order to assemble the system shown for tire pressure monitoring 1 on a rim 10, a tire valve 2 having a pre-assembled tire pressure monitoring unit 3 is introduced into a rim hole 8. The tire valve 2 is then fastened to the rim 10 by means of a union nut 9. The tire pressure monitoring unit 3 is then transferred from a pre-assembly position into a final assembly position by a user through an actuation on the housing 4 of the tire pressure monitoring unit 3.

FIG. 5 shows a perspective illustration of the system for tire pressure monitoring with a release tab 14 according to the first embodiment. In order to dismantle the tire pressure monitoring unit 3 from the tire valve 2, the fastening element 6 can be extended such that the lever arm of the fastening element 6 protrudes from the housing 4, so that a release tab 14 is formed, which can be actuated by the user without any further tools. The elastically mounted lever arm of the fastening element 6 is thereby pulled in the direction pointing away from the tire valve 2, so that the connection between the housing 4 and the tire valve 2 can be released. Alternatively, the dismantling can take place without a release tab 14, as shown in FIG. 4, in that the tire valve 2 is unscrewed from the rim 10 and the tire pressure monitoring unit 3 is moved downwards along the end face of the tire valve 2.

Figure 9:
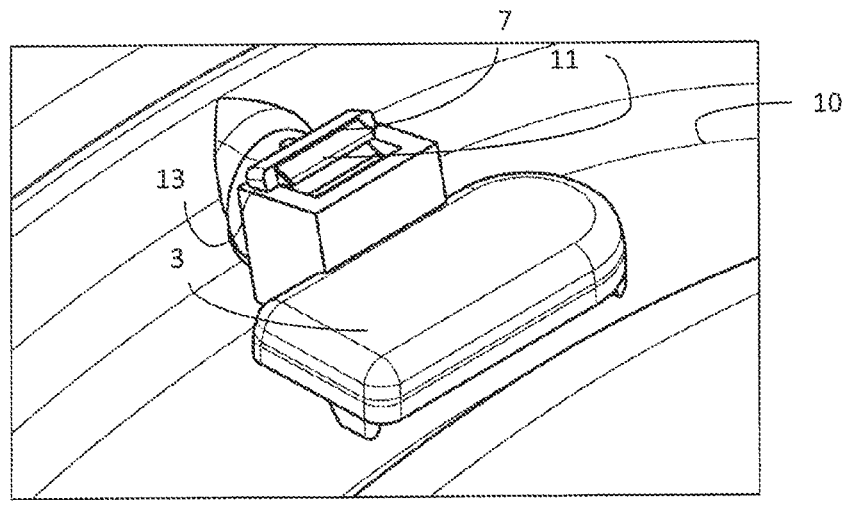

FIG. 6 an exploded illustration of a system for tire pressure monitoring 1 according to a second embodiment. The system for tire pressure monitoring can be assembled on a rim hole 8 of a rim 10. The system for tire pressure monitoring 1 comprises a tire valve 2 and a tire pressure monitoring unit 3, which is provided for disposition on the tire valve 2, and a union nut 9 for fastening the tire valve to the rim 10. The tire pressure monitoring unit 3 comprises a housing 4 made of plastic, which can be made of a thermoplastic, in particular a polybutylene terephthalate reinforced with at least 25 percent glass fibers, in which a pressure sensor (not shown) and a transmitting device are disposed. Measured pressure values transmitted by the tire pressure monitoring unit 3 can be received and evaluated using a suitable receiving device, so that a pressure change can be signaled to the driver of a vehicle. The housing 4 is implemented with a receiving space 12 for the tire valve, wherein a fastening element 6 formed in one piece with the housing 4 and/or of the same material is provided within the receiving space 12. The fastening element 6 is implemented as an elastic lever arm. The lever arm thereby extends essentially orthogonally to the central axis of the tire valve. A snap nose is provided at the outer end of the lever arm. The tire valve 2 is implemented having a tire valve base 7 and a tire valve stem 5 made of metal, wherein at least one holding means 11 is provided on the tire valve base 7 to interact with the fastening element 6 and the tire valve stem 5 with a thread for the union nut for fastening the tire valve 2 to the rim 10. Furthermore, the tire valve base 5 can essentially have a cuboid shape with an end face and side faces, wherein a guide 13 is implemented on at least one vertical side face, as shown in FIG. 9. In contrast to the first embodiment, the end face is provided as a rounded surface which extends orthogonally to the central axis of the tire valve. Furthermore, the guide 13 is provided in the form of an arcuate guide groove or arcuate guide rib. A complementary guide groove or guide rib 15 can be disposed in the housing 4. The holding means 11 can be disposed on the end face. The holding means 11 comprises at least two latching recesses disposed in a row, which extend essentially horizontally on the end face.

Figure 7:
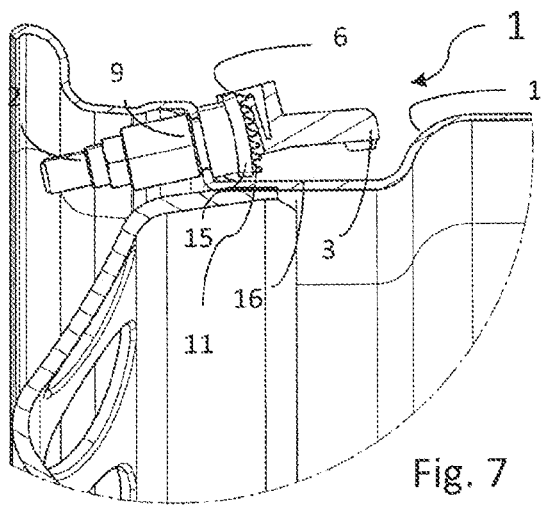
Figure 8:
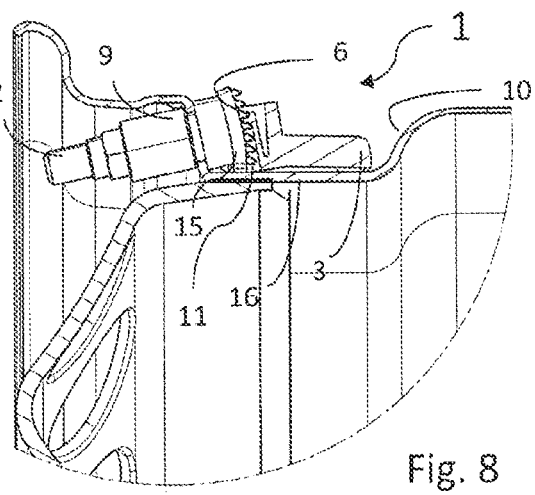

FIG. 7 shows a side illustration of the system for tire pressure monitoring 1 in a pre-assembly position according to the first embodiment, and FIG. 8 shows a side view of the system for tire pressure monitoring in a final assembly position according to the first embodiment.

The tire pressure monitoring unit 3 has a pre-assembly position and a final assembly position, wherein the tire pressure monitoring unit 3 can be transferred from the pre-assembly position into the final assembly position by a user through an actuation on the housing 4 of the tire pressure monitoring unit 3. The tire pressure monitoring unit 3 can thereby be moved in an arcuate or rotational manner from the pre-assembly position into the final assembly position on the tire valve 2. In the embodiment shown, the fastening element 6 allows movement of the tire pressure monitoring unit 3 on the tire valve base 7 only in the direction of a rim well 16 due to the run-up bevel of the snap nose and the elasticity of the lever arm. The fastening element 6 thereby slides one after the other into the latching recesses of the holding means 11 when the housing 4 of the tire pressure monitoring unit 3 is actuated by an external force. A movement of the tire pressure monitoring unit 3 in the direction opposite to that of the rim well 16 is blocked by the fastening element 6 engaging in the holding means 11. Furthermore, the fastening of the tire valve 2 on the rim 10 and the fastening of the tire pressure monitoring unit 3 on the tire valve 2 are decoupled from one another. To align the tire valve 2 on the rim 10, an anti-rotation protection (not shown) can be provided, for example, in the form of at least one spanner flat on the tire valve 2, which interacts with a complementary surface of the rim 10.

In order to assemble the system shown for tire pressure monitoring 1 on a rim 10, a tire valve 2 having a pre-assembled tire pressure monitoring unit 3 is introduced into a rim hole 8. The tire valve 2 is then fastened to the rim 10 by means of a union nut 9. The tire pressure monitoring unit 3 is then transferred from a pre-assembly position into a final assembly position by a user through an actuation on the housing 4 of the tire pressure monitoring unit 3.

The dismantling is carried out in the same way as in the first embodiment. Furthermore, the fastening element 6 can be lengthened such that the lever arm of the fastening element 6 protrudes from the housing 4, so that a release tab 14 is formed, which can be actuated by the user without any further tools. The elastically mounted lever arm of the fastening element 6 is thereby pulled in the direction pointing away from the tire valve 2, so that the connection between the housing 4 and the tire valve 2 can be released.

The invention described above is of course not restricted to the embodiments described and illustrated. It is evident that numerous modifications, which are obvious to a person skilled in the art according to the intended application, can be made to the embodiments shown in the figure, without thereby departing from the scope of the invention. The invention includes everything that is contained in the description and/or illustrated in the drawing, including that which deviates from the specific embodiments and is obvious to the person skilled in the art.

LIST OF REFERENCE SYMBOLS

1 system for tire pressure monitoring
2 tire valve
3 tire pressure monitoring unit
4 housing
5 tire valve stem
6 fastening element
7 tire valve base
8 rim hole
9 union nut
10 rim
11 holding means
12 receiving space
13 guide
14 release tab
15 guide rib
16 rim base This listing of claims will replace all prior versions and listings of claims:

1. A system for tire pressure monitoring having a tire valve for disposition on a rim of a vehicle, the system comprising:
   a tire valve stem and a tire valve base, a holding means being disposed on the tire valve base; and
   a tire pressure monitoring unit having a housing in which a pressure sensor for measuring a tire pressure and a transmitter for wireless transmission of a tire pressure data are disposed;
   wherein the tire valve and the housing of the tire pressure monitoring unit are able to be fastened by means of a fastening element which is implemented in one piece or made of the same material with the housing and which interacts with the holding means;
   wherein the holding means and the fastening element are implemented where the tire pressure monitoring unit on the tire valve base can only move in one direction, being the direction of a rim well
   wherein the holding means in implemented in the form of at least two latching recesses disposed in a row, which extend horizontally on the end face.

2. The system according to claim 1, wherein a movement from the rim well in an opposite direction is combined to be blocked by the fastening element engaging with the holding means.

3. The system according to claim 1, wherein the fastening element is implemented as an elastic lever arm.

4. The system according to claim 3, wherein the lever arm extends orthogonally to the central axis of the tire valve.

5. The system according to claim 3, wherein the lever arm is implemented as a metal insert.

6. The system according to claim 1, wherein the tire valve base has a cuboid shape with an end face and side faces, wherein a guide of the tire valve base is implemented on at least one side face.

7. The system according to claim 6, wherein the holding means is implemented on the end face.

8. The system according to claim 1, wherein the tire valve base comprises a guide, in particular in the form of a guide groove or a guide rib.

9. The system according to claim 1, wherein the housing is made from a thermoplastic, in particular from a polybutylene terephthalate reinforced with at least 25 percent glass fibers.

10. The system according to claim 3, wherein the lever arm of the fastening element protrudes from the housing forming a release tab configured to be actuated by the user to dismantle the tire pressure monitoring unit without any further tools.

11. A system for tire pressure monitoring having a tire valve for disposition on a rim of a vehicle, the system comprising:
   a tire valve stem having a tire valve base and a holding means being disposed on the tire valve base; and
   a tire pressure monitoring unit having a housing in which a pressure sensor for measuring a tire pressure and a transmitter for wireless transmission of a tire pressure data are disposed;
   wherein the tire valve and the housing of the tire pressure monitoring unit are able to be fastened by means of an elastic lever arm which interacts with the holding means;
   wherein the lever arm protrudes from the housing forming a release tab configured to be actuated by the user to dismantle the tire pressure monitoring unit without any further tools;
   wherein the holding means and the lever arm are implemented where the tire pressure monitoring unit on the tire valve base can only move in one direction, being the direction of a rim well.

12. A system for tire pressure monitoring having a tire valve for disposition on a rim of a vehicle, the system comprising:
- a tire valve stem and a tire valve base, a holding means being disposed on the tire valve base; and
- a tire pressure monitoring unit having a housing in which a pressure sensor for measuring a tire pressure and a transmitter for wireless transmission of a tire pressure data are disposed;
- wherein the tire valve and the housing of the tire pressure monitoring unit are able to be fastened by an elastic lever arm connected to the housing which interacts with the holding means of the tire valve base;
- wherein the lever arm extends orthogonally to a central axis of the tire valve;
- wherein the holding means and the lever arm are implemented where the tire pressure monitoring unit on the tire valve base can only move in one direction, being the direction of a rim well.

* * * * *

UNITED STATES PATENT AND TRADEMARK OFFICE
CERTIFICATE OF CORRECTION

PATENT NO.         : 11,794,533 B2
APPLICATION NO.    : 17/302431
DATED              : October 24, 2023
INVENTOR(S)        : Benedikt Gamer et al.

It is certified that error appears in the above-identified patent and that said Letters Patent is hereby corrected as shown below:

In the Claims

In Column 8, Claim 1, Line 14, "in" should read --is--.

In Column 8, Claim 2, Line 18, "combined" should read --configured--.

Signed and Sealed this
Ninth Day of April, 2024

Katherine Kelly Vidal
*Director of the United States Patent and Trademark Office*